United States Patent
Yamamoto et al.

(10) Patent No.: US 7,696,291 B2
(45) Date of Patent: Apr. 13, 2010

(54) FLUOROPOLYMER FOR CHROMATIC ABERRATION-FREE LENS AND CHROMATIC ABERRATION-FREE LENS

(75) Inventors: Hiromasa Yamamoto, Tokyo (JP); Hideki Sato, Tokyo (JP)

(73) Assignee: Asahi Glass Company, Limited, Tokyo (JP)

( * ) Notice: Subject to any disclaimer, the term of this patent is extended or adjusted under 35 U.S.C. 154(b) by 0 days.

(21) Appl. No.: 12/180,005

(22) Filed: Jul. 25, 2008

(65) Prior Publication Data

US 2008/0306232 A1    Dec. 11, 2008

Related U.S. Application Data

(63) Continuation of application No. PCT/JP2007/051199, filed on Jan. 25, 2007.

(30) Foreign Application Priority Data

Jan. 27, 2006    (JP) .............................. 2006-019072

(51) Int. Cl.
*C08F 16/24* (2006.01)
(52) U.S. Cl. ............. 526/247; 526/242; 526/252; 526/266; 526/270; 526/332; 526/336; 526/338; 359/362; 501/11
(58) Field of Classification Search .............. 526/247
See application file for complete search history.

(56) References Cited

U.S. PATENT DOCUMENTS

| | | | | |
|---|---|---|---|---|
| 4,431,786 A | * | 2/1984 | Squire | 526/247 |
| 4,910,276 A | * | 3/1990 | Nakamura et al. | 526/247 |
| 4,948,851 A | * | 8/1990 | Squire | 526/247 |
| 6,201,085 B1 | * | 3/2001 | Matsukura et al. | 526/247 |
| 6,931,207 B2 | | 8/2005 | Nanba | |

FOREIGN PATENT DOCUMENTS

| | | |
|---|---|---|
| EP | 1 376 157 A2 | 1/2004 |
| JP | 07-199123 | 8/1995 |
| JP | 2004-020912 | 1/2004 |
| JP | 2004-333768 | 11/2004 |

OTHER PUBLICATIONS machine translation of JP 07-199123 A.*

* cited by examiner

*Primary Examiner*—Mark Eashoo
*Assistant Examiner*—Nicole M Buie-Hatcher
(74) *Attorney, Agent, or Firm*—Oblon, Spivak, McClelland, Maier & Neustadt, L.L.P.

(57) ABSTRACT

A material having properties required for a chromatic aberration-free lens and excellent in moldability and impact resistance, which material is an amorphous fluoropolymer containing a carbon atom chain as a main chain and containing a fluorinated atom-bonded carbon atom as a carbon atom of the main chain, wherein $vd > 75$, $\theta gF > 0.50$, and $\Delta\theta gF > 0.03$, where vd represents an Abbe number, $\theta gF$ represents a relative partial dispersion of a g-F line, and $\Delta\theta gF$ represents a deviation from a standard line of the relative partial dispersion of the g-F line.

15 Claims, No Drawings

FLUOROPOLYMER FOR CHROMATIC ABERRATION-FREE LENS AND CHROMATIC ABERRATION-FREE LENS

TECHNICAL FIELD

The present invention relates to a fluoropolymer for a chromatic aberration-free lens, a chromatic aberration-free lens made of it and a chromatic aberration-free lens system.

BACKGROUND ART

It has been known that by employing specific low dispersion glass having a high Abbe number and a large deviation from a standard line of a relative partial dispersion (anomalous dispersion) in a combination with high dispersion glass having a large difference of refractive indexes depending on various wavelengths of light, it is possible to effectively correct secondary chromatic aberration (Patent Documents 1 and 2).

However, it is difficult to mold the specific low dispersion glass and also difficult to process the specific low dispersion glass into a complex form such as an aspherical shape. Further, impact resistance of lenses made of such specific low dispersion glass is low, and its handling property is poor.

On the other hand, as a resin material for lenses, ZEONEX (manufactured by ZEON CORPORATION), APEL (manufactured by Mitsui Chemicals, Inc.), etc. are known. However, since their Abbe number is low at a level of about 55 and their anomalous dispersion is also low, their properties required for chromatic aberration-free lenses are insufficient.

Patent Document 1: JP-A-7-199123 (Means for solving the problem)

Patent Document 2: JP-A-2004-333768 (paragraph [0040])

DISCLOSURE OF THE INVENTION

Object to be Accomplished by the Invention

It is an object of the present invention to provide a material which has properties required for chromatic aberration-free lenses and which is excellent in a moldability and impact resistance.

Means to Accomplish the Object

The present inventors have found that a specific fluoropolymer is useful for chromatic aberration-free lenses and have accomplished the present invention.

The present invention provides the following.

(1) A fluoropolymer for a chromatic aberration-free lens, which is an amorphous fluoropolymer containing a carbon atom chain as a main chain and containing a fluorinated atom-bonded carbon atom as a carbon atom of the main chain, characterized in that vd>75, θgF>0.50, and ΔθgF>0.03, where vd represents an Abbe number, θgF represents a relative partial dispersion of a g-F line, and ΔθgF represents a deviation from a standard line of the relative partial dispersion of the g-F line.

(2) The fluoropolymer according to the above (1), which has an aliphatic ring structure in the main chain.

(3) The fluoropolymer according to the above (2), which contains, as a carbon atom of the main chain which constitutes one aliphatic ring, a fluorine atom- or oxygen atom-bonded carbon atom and no hydrogen atom-bonded carbon atom.

(4) The fluoropolymer according to the above (2), which contains, as a carbon atom of the main chain which constitutes one aliphatic ring, a fluorine atom- or oxygen atom-bonded carbon atom and a hydrogen atom-bonded carbon atom.

(5) The fluoropolymer according the above (2), which contains, as a carbon of the main chain which constitutes one aliphatic ring, a hydrogen atom-bonded carbon atom and no fluorine atom-bonded carbon atom; and contains, as a carbon atom of the main chain which does not constitute the aliphatic ring, a fluorine atom-bonded carbon atom.

(6) The fluoropolymer according to the above (2), which is obtained by polymerizing a cyclic monomer containing, as a carbon atom which constitutes a polymerizable double bond, a fluorine atom-bonded carbon atom and no hydrogen atom-bonded carbon atom or which is obtained by cyclopolymerizing a diene monomer containing, as a carbon atom which constitutes a polymerizable double bond, a fluorine atom-bonded carbon atom and no hydrogen atom-bonded carbon atom.

(7) The fluoropolymer according to the above (2), which is obtained by cyclopolymerizing a diene monomer containing, as a carbon atom which constitutes a polymerizable double bond, a fluorine atom-bonded carbon atom and a hydrogen atom-bonded carbon atom.

(8) The fluoropolymer according to the above (2), which is obtained by polymerizing a fluoroolefin and a cyclic monomer containing, as a carbon atom which constitutes a polymerizable double bond, a hydrogen atom-bonded carbon atom and no fluorine atom-bonded carbon atom.

(9) The fluoropolymer according to the above (6), which contains a monomer unit formed by polymerizing a monomer represented by the following formula (1) or the following formula (2):

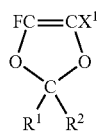

(1)

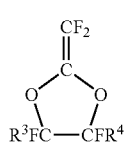

(2)

where $X^1$ is a fluorine atom, a $C_{1-4}$ perfluoroalkyl group or a $C_{1-4}$ perfluoroalkoxyl group, each of $R^1$ and $R^2$ which are independent of each another is a fluorine atom, a $C_{1-4}$ perfluoroalkyl group or a $C_{1-4}$ perfluoroalkoxyl group, and each of $R^3$ and $R^4$ which are independent of each other is a fluorine atom or a trifluoroalkyl group.

(10) The fluoropolymer according to the above (6), which contains a monomer unit formed by cyclopolymerizing a monomer represented by the following formula (3):

$$CF_2=CF-Q^1-CF=CF_2 \qquad (3)$$

where $Q^1$ is a perfluoroalkylene group which may contain an ethereal oxygen atom, wherein the total number of carbon atoms and oxygen atoms excluding a side chain is from 2 to 4.

(11) The fluoropolymer according to the above (7), which contains a monomer unit formed by cyclopolymerizing a monomer represented by the following formula (4):

$$CFX^2=CX^3-Q^2-CH=CH_2 \quad (4)$$

where $X^2$ and $X^3$ are fluorine atoms or together form an epoxy oxygen atom or a $C_{2-4}$ perfluoroalkylene group which may contain an ethereal oxygen atom, and $Q^2$ is an alkylene group which may contain an ethereal oxygen atom or a fluorine atom, wherein the total number of carbon atoms and oxygen atoms excluding a side chain is from 2 to 4.

(12) The fluoropolymer according to the above (8), which contains a monomer unit formed by polymerizing a monomer represented by the following formula (5), the following formula (6) or the following formula (7), and a monomer unit formed by polymerizing a monomer represented by the following formula (8):

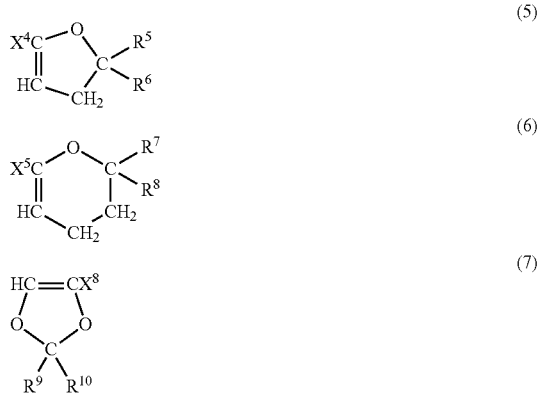

where $X^4$ is a hydrogen atom or a methyl group, each of $R^5$ and $R^6$ which are independent of each other is a hydrogen atom, a fluorine atom or an alkyl group which may contain a fluorine atom, or they together form a $C_{3-5}$ alkylene group which may contain an ethereal oxygen atom or a fluorine atom, $X^5$ is a hydrogen atom or a methyl group, each of $R^7$ and $R^3$ which are independent of each other is a hydrogen atom, a fluorine atom or an alkyl group which may contain a fluorine atom, or they together form a $C_{3-5}$ alkylene group which may contain an ethereal oxygen atom or a fluorine atom, $X^8$ is a hydrogen atom or a methyl group, and each of $R^9$ and $R^{10}$ which are independent of each other is a hydrogen atom, a fluorine atom or an alkyl group which may contain a fluorine atom, or they together form a $C_{3-5}$ alkylene group which may contain an ethereal oxygen atom or a fluorine atom;

$$CF_2=CX^6X^7 \quad (8)$$

where each of $X^6$ and $X^7$ which are independent of each other is a fluorine atom, a chlorine atom, a hydrogen atom or a trifluoromethyl group.

(13) A chromatic aberration-free lens which is made of the fluoropolymer as defined in any one of the above (1) to (12).

(14) A chromatic aberration-free lens system comprising a combination of a lens wherein nd>1.6, and vd<40, where nd represents a refractive index, and vd represents an Abbe number, and the chromatic aberration-free lens as defined in the above (13).

EFFECT OF THE INVENTION

Since the fluoropolymer of the present invention has a high Abbe number, a large relative partial dispersion and a large anomalous dispersion, by a chromatic aberration-free lens made of it, it is possible to effectively correct secondary chromatic aberration. Further, the fluoropolymer is excellent in moldability and a chromatic aberration-free lens made of the fluoropolymer is excellent in impact resistance and handling efficiency.

BEST MODE FOR CARRYING OUT THE INVENTION

In the present specification, a compound represented by the formula (1) is referred to as "compound (1)". The same applies to compounds represented by other formulae.

The fluoropolymer of the present invention has a carbon atom chain as a main chain. Basically, the carbon atom chain as the main chain of the polymer is a chain wherein two carbon atoms constituting a polymerizable double bond of a monomer are connected. Accordingly, in the fluoropolymer, "contains, as a carbon atom of the main chain, a fluorine atom-bonded carbon atom" means that a polymer contains a monomer unit formed by polymerizing a monomer wherein a fluorine atom is bonded to at least one carbon atom in the two carbon atoms constituting a polymerizable double bond of a monomer.

Compared to a C—F bond in a fluorine atom-bonded carbon atom, a C—H bond in a hydrogen atom-bonded carbon atom has a low bond energy, whereby resonance vibration tends to occur in a near-ultraviolet region. Therefore, in a case where among carbon atoms of the main chain, only hydrogen-bonded carbon atoms (particularly $CH_2$ groups) are consecutively present in series, the polymer tends to be hardly transparent even in a near-ultraviolet region (about 300 to 400 nm region), and the Abbe number tends to be low. Therefore, for the fluoropolymer of the present invention to be transparent until a near-ultraviolet region, it is preferably a perfuoropolymer or a polymer having a structure wherein hydrogen atom-bonded carbon atoms may be contained in the main chain, but the hydrogen atom-bonded carbon atoms are not consecutively present among carbon atoms of the main chain.

Further, since the fluoropolymer of the present invention is amorphous, it is excellent in transparency even in a near-ultraviolet region. Crystallinity index of the polymer is preferably at most 30%, particularly preferably at most 20%.

As the amorphous fluoropolymer, a polymer having an aliphatic ring structure in the main chain, a tetrafluoroethylene/vinylidene fluoride/hexafluoropropyrene copolymer, a tetrafluoroethylene/perfluoro(methyl vinyl ether) copolymer or a tetrafluoroethylene/perfluoro(propyl vinyl ether) copolymer is preferred, and the polymer having an aliphatic ring structure in the main chain is particularly preferred. By having an aliphatic ring structure in the main chain, high transparency and high heat resistance can be attained.

The high transparency contributes to attainment of a high Abbe number. Further, the refractive index of a g line is higher than that of a F line, d line or C line, and the refractive indexes of the F line, d line and C line do not vary so much, whereby a high relative partial dispersion can be obtained. Namely, high transparency in a visible light region is essential.

The fluoropolymer having an aliphatic ring structure in the main chain means that at least one carbon atom which constitutes an aliphatic ring structure in the main chain is a carbon atom of the main chain of the polymer. The carbon atom in the main chain is derived from two carbon atoms of a polymerizable double bond of a monomer which constitutes the polymer, or in a case of the polymer formed by cyclopolymerizing a monomer having two polymerizable double bonds, it is derived from four carbon atoms of such two polymerizable double bonds. Atoms which constitute the aliphatic ring structure may contain an oxygen atom or a nitrogen atom, in addition to carbon atoms. The aliphatic ring structure preferably has one or two oxygen atoms. The number of atoms which constitute the aliphatic ring structure is preferably from 4 to 7, more preferably 5 or 6.

The fluoropolymer having an aliphatic ring structure in the main chain may, for example, be a homopolymer or a copolymer of a cyclic monomer, or a homopolymer or a copolymer formed by cyclopolymerizing a diene monomer. These copolymers may, for example, be a copolymer of a cyclic monomer and another monomer, a copolymer of a diene monomer and another monomer, or a copolymer of a cyclic monomer and a diene monomer.

Here, "cyclic monomer" is a monomer having an aliphatic ring structure and a polymerizable double bond between carbon-carbon atoms which constitute the aliphatic ring structure or a monomer having an aliphatic ring structure and a polymerizable double bond between a carbon atom which constitutes the aliphatic ring structure and a carbon atom other than the aliphatic ring structure. Further, "diene monomer" is a monomer having two polymerizable double bonds.

As the amorphous fluoropolymer containing a carbon atom chain as a main chain and a fluorinated atom-bonded carbon atom as a carbon atom of the main chain and having an aliphatic ring structure in the main chain, the following polymers are preferred.

(1) A fluoropolymer which contains, as a carbon atom of the main chain which constitutes one aliphatic ring, a fluorine atom- or oxygen atom-bonded carbon atom and no hydrogen atom-bonded carbon atom.

(2) A fluoropolymer which contains, as a carbon atom of the main chain which constitutes one aliphatic ring, a fluorine atom- or oxygen atom-bonded carbon atom and a hydrogen atom-bonded carbon atom.

(3) A fluoropolymer which contains, as a carbon atom of the main chain which constitutes one aliphatic ring, a hydrogen atom-bonded carbon atom and no fluorine atom-bonded carbon atom; and contains, as a carbon atom of the main chain which does not constitute the aliphatic ring, a fluorine atom-bonded carbon atom.

The above fluoropolymer (1) can be obtained by polymerizing a cyclic monomer containing, as a carbon atom which constitutes a polymerizable double bond, a fluorine atom-bonded carbon atom and no hydrogen atom-bonded carbon atom or cyclopolymerizing a diene monomer containing, as a carbon atom which constitutes a polymerizable double bond, a fluorine atom-bonded carbon atom and no hydrogen atom-bonded carbon atom.

As the above cyclic monomer containing, as a carbon atom which constitutes a polymerizable double bond, a fluorine atom-bonded carbon atom and no hydrogen atom-bonded carbon atom, the following monomer (1) or (2) is preferred. $X^1$, $R^1$, $R^2$, $R^3$ and $R^4$ are as defined above.

$X^1$ is preferably a fluorine atom or a trifluoroalkoxy group. Each of $R^1$ and $R^2$ which are independent of each another is preferably a fluorine atom or a trifluoromethyl group. Each of $R^3$ and $R^4$ which are independent of each other is preferably a fluorine atom or a trifluoromethyl group.

As specific examples of the monomer (1), the following monomers may be mentioned. Since heat resistance of a polymer to be obtained is high, the monomer (1-1) is preferred.

As specific examples of the monomer (2), the following monomers may be mentioned. Since it can be synthesized simply, the monomer (2-2) is preferred.

As the diene monomer containing, as a carbon atom which constitutes a polymerizable double bond, a fluorine atom-bonded carbon atom and no hydrogen atom-bonded carbon atom, the following monomer (3) is preferred. $Q^1$ is as defined above.

$Q^1$ preferably has the total number of carbon atoms and oxygen atoms excluding a side chain of 2 or 3. In a case where $Q^1$ is a perfluoroalkylene group containing an ethereal oxygen atom, the ethereal oxygen atom may exist at one terminal of the group, at each terminal of the group or between carbon atoms of the group. From the viewpoint of cyclopolymerizability, it is preferred that the ethereal oxygen atom exists at one terminal of the group.

By cyclopolymerizing the above monomer, a fluoropolymer containing at least one monomer unit selected from the group consisting of the following monomer unit (A), the following monomer unit (B) and the following monomer unit (C) is formed. In a fluoropolymer obtained by cyclopolymerizing a diene monomer, carbon atoms of the main chain are derived from four carbon atoms of two polymerizable double bonds.

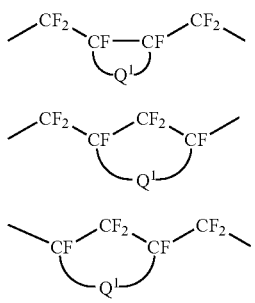

As specific examples of the monomer (3), the following monomers may be mentioned. Since it can be synthesized simply, and heat resistance of a polymer to be obtained is high, the monomer (3-3) or the monomer (3-4) is preferred.

$$CF_2\!\!=\!\!CFOCF_2CF\!\!=\!\!CF_2 \quad (3\text{-}1)$$

$$CF_2\!\!=\!\!CFOCF(CF_3)CF\!\!=\!\!CF_2 \quad (3\text{-}2)$$

$$CF_2\!\!=\!\!CFOCF_2CF_2CF\!\!=\!\!CF_2 \quad (3\text{-}3)$$

$$CF_2\!\!=\!\!CFOCF(CF_3)CF_2CF\!\!=\!\!CF_2 \quad (3\text{-}4)$$

$$CF_2\!\!=\!\!CFOCF_2CF(OCF_3)CF\!\!=\!\!CF_2 \quad (3\text{-}5)$$

$$CF_2\!\!=\!\!CFOCF_2OCF\!\!=\!\!CF_2 \quad (3\text{-}6)$$

$$CF_2\!\!=\!\!CFOC(CF_3)_2OCF\!\!=\!\!CF_2 \quad (3\text{-}7)$$

In the cyclic monomer and the diene monomer, the ratio of the number of fluorine atoms which are bonded to carbon atoms to the total number of hydrogen atoms which are bonded to carbon atoms and fluorine atoms which are bonded to carbon atoms is preferably at least 80%, and particularly preferably 100%.

As a monomer which is copolymerized with a cyclic monomer or a diene monomer, a fluoroolefin is preferred.

In the above fluoropolymer (1), the ratio of the monomer unit having an aliphatic ring structure to the total monomer units is preferably at least 50 mol %, more preferably at least 80 mol %, and the main chain is particularly preferably made of only monomer units having a fluoroaliphatic ring structure. Here, the monomer unit having a fluoroaliphatic ring structure is a monomer unit formed by polymerizing a cyclic monomer or a monomer unit formed by cyclopolymerizing a diene monomer. By containing the monomer unit having a fluoroaliphatic ring structure in a high ratio, the fluoropolymer (1) has high transparency, a high Abbe number, a high relative partial dispersion and anomalous dispersion.

The above fluoropolymer (2) can be obtained by cyclopolymerizing a diene monomer containing, as a carbon atom which constitutes a polymerizable double bond, a fluorine atom-bonded carbon atom and a hydrogen atom-bonded carbon atom.

Namely, the fluoropolymer of the present invention preferably contains a monomer unit formed by cyclopolymerizing the following monomer unit (4). $X^2$, $X^3$ and $Q^2$ are as defined above.

$$CFX^2\!\!=\!\!CX^3\text{-}Q^2\text{-}CH\!\!=\!\!CH_2 \quad (4)$$

$Q^2$ preferably has the total number of carbon atoms and oxygen atoms excluding a side chain of 2 or 3. In a case where $Q^2$ is an alkylene group which contains an ethereal oxygen atom, the ethereal oxygen atom may exist at one terminal of the group, at each terminal of the group or between carbon atoms of the group. From the viewpoint of cyclopolymerizability, it is preferred that the ethereal oxygen atom exists at one terminal of the group.

$Q^2$ is preferably a group represented by $-OCR^{10}R^{11}CR^{12}R^{13}-$. Here, each of $R^{10}$, $R^{12}$ and $R^{13}$ which are independent of one another is a fluorine atom or a hydrogen atom. $R^{11}$ is a fluorine atom, a trifluoromethyl group, a hydrogen atom or a methyl group.

By cyclopolymerizing the above monomer, a fluoropolymer containing at least one monomer unit selected from the group consisting of the following monomer unit (D), the following monomer unit (E) and the following monomer unit (F), is formed.

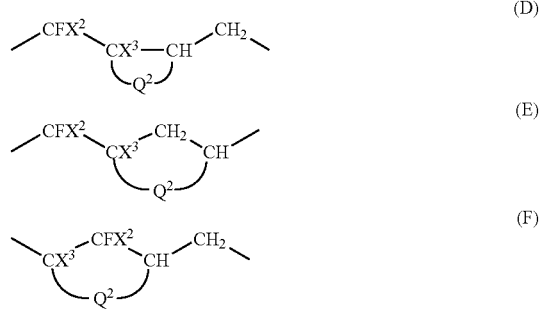

As specific examples of the monomer (4), the following monomers may be mentioned. Since it can be synthesized simply, and heat resistance of a polymer to be obtained is high, the monomer (4-1), the monomer (4-2), the monomer (4-5) or the monomer (4-6) is preferred.

$$CF_2\!\!=\!\!CFOCF_2CF_2CH\!\!=\!\!CH_2 \quad (4\text{-}1)$$

$$CF_2\!\!=\!\!CFOCH_2CH_2CH\!\!=\!\!CH_2 \quad (4\text{-}2)$$

$$CF_2\!\!=\!\!CFOCH(CH_3)CH_2CH\!\!=\!\!CH_2 \quad (4\text{-}3)$$

$$CF_2\!\!=\!\!CFOCF(CF_3)CF_2CH\!\!=\!\!CH_2 \quad (4\text{-}4)$$

(4-5)

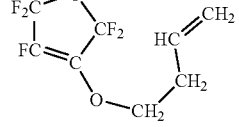

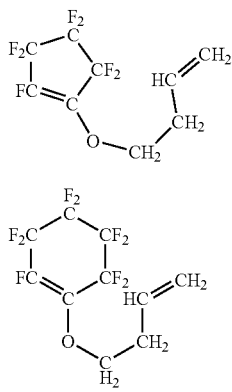

(4-6)

(4-7)

The above fluoropolymer (2) contains as a carbon atom of the main chain, a hydrogen atom-bonded carbon atom, however, by containing a fluorine atom-bonded carbon atom derived from the same monomer, it can be prevented that the main chain has a structure of long sequence of hydrogen atom-bonded carbon atoms. Therefore, the fluoropolymer has high transparency, a high Abbe number, a high relative partial dispersion and anomalous dispersion.

The above fluoropolymer (3) can be produced by polymerizing a fluoroolefin and a cyclic monomer containing, as a carbon atom which constitutes a polymerizable double bond, a hydrogen atom-bonded carbon atom and no fluorine atom-bonded carbon atom.

Namely, the fluoropolymer of the present invention preferably contains a monomer unit formed by polymerizing the following formula (5), the following formula (6) or the following formula (7), and a monomer unit formed by polymerizing the following monomer (8). $X^4$, $X^5$, $X^6$, $X^7$, $X^8$, $R^5$, $R^6$, $R^7$, $R^8$, $R^9$ and $R^{10}$ are as defined above.

(5)

(6)

(7)

(8)

$CF_2 = CX^6X^7$

In the monomer (5), each of $R^5$ and $R^6$ which are independent of each other is preferably a hydrogen atom or a methyl group.

As specific examples of the monomer (5), the following monomers may be mentioned. Since it can be synthesized simply, the monomer (5-1), the monomer (5-2), the monomer (5-3), the monomer (5-4) or the monomer (5-6) is preferred.

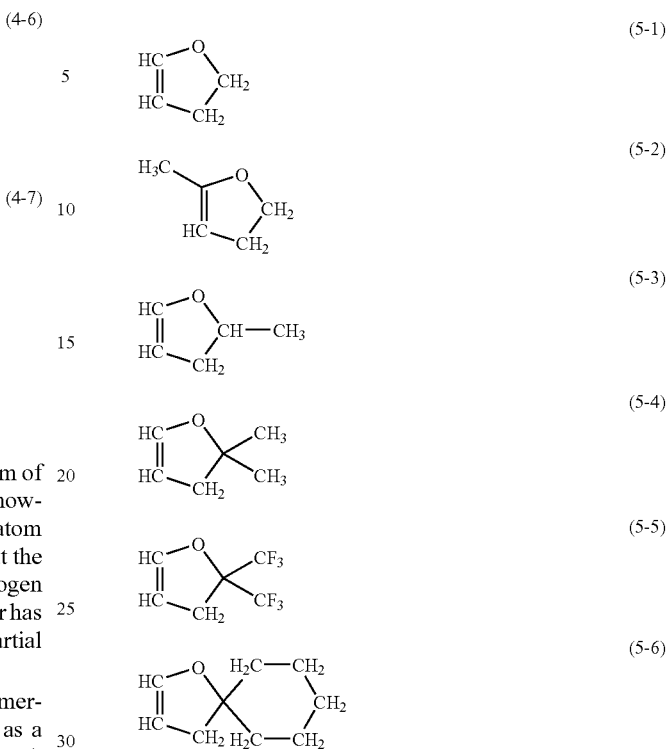

In the monomer (6), each of $R^7$ and $R^8$ which are independent of each other is preferably a hydrogen atom or a methyl group.

As specific examples of the monomer (6), the following monomers may be mentioned. Since it can be synthesized simply, the monomer (6-1), the monomer (6-3) or the monomer (6-4) is preferred.

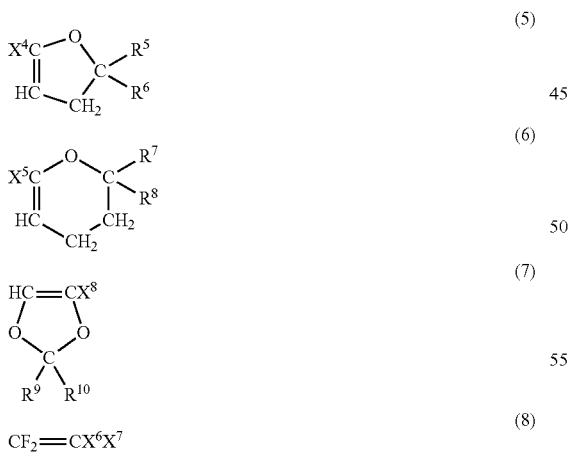

-continued (6-6)

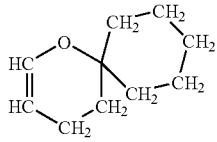

In the monomer (7), each of $R^9$ and $R^{10}$ which are independent of each other is preferably a trifluoromethyl group or a methyl group.

As specific examples of the monomer (7), the following monomers may be mentioned. Since it can be synthesized simply, the monomer (7-1), the monomer (7-2) or the monomer (7-5) is preferred.

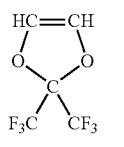
(7-1)

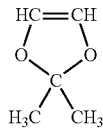
(7-2)

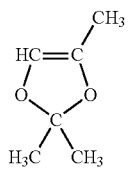
(7-3)

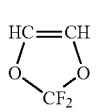
(7-4)

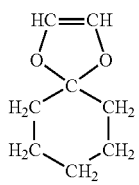
(7-5)

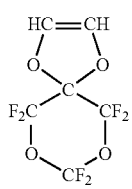
(7-6)

As specific examples of the monomer (8), the following monomers may be mentioned. From the viewpoint of high polymerizability, the monomer (8-1) or the monomer (8-2) is preferred.

$CF_2\!\!=\!\!CF_2$ (8-1)

$CF_2\!\!=\!\!CFCl$ (8-2)

$CF_2\!\!=\!\!CF(CF_3)$ (8-3)

$CF_2\!\!=\!\!CHF$ (8-4)

$CFCl\!\!=\!\!CFCl$ (8-5)

$CF_2\!\!=\!\!C(CF_3)_2$ (8-6)

In the above fluoropolymer (3), the ratio of the monomer unit formed by polymerizing the above monomer (5), the above monomer (6) or the above monomer (7) to the monomer unit formed by polymerizing the above monomer (8) is preferably from 40:60 to 60:40, more preferably from 55:45 to 45:55. In addition to the above ratio of the monomer units, the fluoropolymer (3) is preferably a random copolymer. Such a fluoropolymer contains as a carbon atom of the main chain, a hydrogen atom-bonded carbon atom, however, by containing a fluorine atom-bonded carbon atom, it can be prevented that the main chain has a structure of long sequence of hydrogen atom-bonded carbon atoms. Accordingly, the fluoropolymer has high transparency, a high Abbe number, a high relative partial dispersion and an anomalous dispersion.

The mass average molecular weight of the fluoropolymer of the present invention is preferably from 5,000 to 500,000, particularly preferably from 10,000 to 300,000.

The polymerization reaction is preferably carried out in the presence of a radical initiator. As the radical initiator, radical initiators used for conventional radical polymerization may be mentioned, and an azo compound, an organic peroxy carbonate, an organic peroxide, an inorganic peroxide or an organic peroxy ester may, for example, be mentioned.

As specific examples of the radical initiator, an azo compound such as 2,2'-azobis(2-amidinopropane)dihydrochloride, 4,4'-azobis(4-cyanopentanoic acid), 2,2'-azobis(4-methoxy-2,4-dimethylvaleronitrile) or 1,1'-azobis(1-cyclohexanecarbonitrile); an organic peroxy carbonate such as diisopropyl peroxy dicarbonate; an organic peroxide such as perfluorobenzoyl peroxide, perfluorobenzoyl peroxide, perfluorononanoyl peroxide, methyl ethyl ketone peroxide or diisopropylperoxy dicarbonate; an inorganic peroxide such as $K_2S_2O_8$ or $(NH_4)_2S_2O_8$; or an organic peroxy ester such as PERBUTYL PV (trade name, manufactured by NOF CORPORATION) or PERBUTYL O (trade name, manufactured by NOF corporation) may be mentioned.

The polymerization method is not particularly limited, and preferably bulk polymerization, solution polymerization, suspension polymerization and emulsion polymerization may be mentioned. Temperature and pressure in the polymerization are also not particularly limited. The polymerization temperature is preferably from 0 to 200° C., particularly preferably from 30 to 100° C. The polymerization may be carried out under reduced pressure or under pressure, and the polymerization pressure is preferably from 0 to 10 MPa (gage pressure), particularly preferably from 0 to 5 MPa (gage pressure).

As a method for producing chromatic aberration-free lenses by employing the fluoropolymer of the present invention, conventional methods for producing a lens made of a resin can be employed. Since the resin of the present invention is soluble in a solvent, thin optical lenses can be produced by cast molding, etc. with a solution of the resin of the present invention. Further, since the resin of the present invention is a thermoplastic resin, injection molding or compression molding may be employed.

In a case where the fluoropolymer is a perfluoropolymer, as a solvent for cast molding, a fluorine type solvent may be selected freely. As specific examples, ASAHIKLIN AK-225 (trade name, manufactured by Asahi Glass Company, Limited), trichlorotrifluoro ethane or perfluoro methyl decalin may be mentioned. In a case where the fluoropolymer is a resin containing a hydrogen atom, a hydrocarbon type solvent may be selected freely. As specific examples, acetone, DMF or ethyl acetate may be mentioned.

At a time of carrying out injection molding, in order to prevent a stress from remaining in the resin or a double refraction from forming, an injection compression molding method may, for example, be employed.

The fluoropolymer of the present invention has not only high transparency in a visible range, but also a high Abbe number, a high relative partial dispersion and anomalous dispersion. In the fluoropolymer of the present invention, $vd>75$, $\theta gF>0.50$, and $\Delta\theta gF>0.03$, where vd represents an Abbe number, $\theta gF$ represents a relative partial dispersion of a g-F line, and $\Delta\theta gF$ represents a deviation from a standard line of the relative partial dispersion of the g-F line. It is more preferred that $vd>80$, $\theta gF>0.52$, and $\Delta\theta gF>0.04$, and it is further preferred that $vd>90$, $\theta gF>0.55$, and $\Delta\theta gF>0.05$.

When a chromatic aberration-free lens made of the fluoropolymer of the present invention is used in a combination with a lens made of high refractive index/high dispersion glass (refractive index $nd>1.6$, $vd<40$) such as optical glass F2 manufactured by SCHOTT AG or optical glass S-TIM2 manufactured by OHARA INC, it is possible to approximate $(\theta 1-\theta 2)/(v1-v2)$, which represents a chromatic aberration amount, to zero. Namely, the chromatic aberration amount or chromatic aberration can be substantially reduced.

Here, $(\theta 1-\theta 2)$ represents a difference in the relative partial dispersion of a g-F line between the fluoropolymer of the present invention and the high refractive index/high dispersion glass, and $(v1-v2)$ represents a difference in the Abbe number between the fluoropolymer of the present invention and the high refractive index/high dispersion glass.

When a lens is formed from the fluoropolymer of the present invention and used as a chromatic aberration-free lens, it has much better impact resistance and moldability than conventional glass materials. Therefore, by the present invention, a chromatic aberration-free lens which is remarkably industrially useful can be provided.

EXAMPLES

Now, the present invention will be described in further detail with reference to Examples. However, it should be understood that the present invention is by no means restricted to such specific Examples.

Further, the refractive indexes were measured by V block method by means of refractometer PR-2, manufactured by Carl Zeiss Jena. Hereinafter, nc represents a refractive index at a C line, nd represents a refractive index at a d line, nF represents a refractive index at a F line, ng represents a refractive index at a g line, vd represents an Abbe number, $\theta gF$ represents a relative partial dispersion of a g-F line, and $\Delta\theta gF$ represents a deviation from a standard line of the relative partial dispersion of the g-F line (anomalous dispersion).

Preparation Example 1

Into a pressure resistant reactor (internal volume: 30 mL, made of glass), 4.0 g of perfluoro(2-methylene-4-methyl-1,3-dioxolane (the above compound (2-2)), 15 mg of $(CF_3CF_2CF_2COO—)_2$ as a polymerization initiator and 35.9 g of 1H-perfluorohexane as a polymerization solvent were added. Then, the interior of the pressure resistant reactor was replaced with nitrogen gas, and the mixture was then heated to 30° C. to carry out polymerization for 18 hours. As a result, 3.9 g of a polymer (hereinafter, referred to as "polymer (A1)") was obtained.

The infrared absorption spectrum of this polymer was measured, and it was confirmed that the absorption attributable to a double bond of a monomer disappeared.

Preparation Example 2

Into a pressure resistant reactor (internal volume: 30 mL, made of glass), 3.8 g of 1,1,2,4,4,5,5-heptafluoro-3-oxa-1,6-heptadiene (the above compound (4-1)), 7.5 mg of $(CF_3CF_2CF_2COO—)_2$ as a polymerization initiator and 24.6 g of Fluorinert FC-77 (trade name, manufactured by Sumitomo 3M Limited) as a polymerization solvent were added. Then, the interior of the pressure resistant reactor was replaced with nitrogen gas, and the mixture was cooled to 20° C. to carry out polymerization for 25 hours. As a result, 3.8 g of a polymer (hereinafter, referred to as "polymer (A2)") was obtained.

The infrared absorption spectrum of this polymer was measured, and it was confirmed that absorption attributable to a double bond of a monomer disappeared.

Preparation Example 3

Into a pressure resistant reactor (internal volume: 200 mL, made of stainless steel), 6.7 g of dihydrofuran, 1.7 g of a 50 mass % xylene solution of PERBUTYL PV (trade name, manufactured by NOF CORPORATION) as a polymerization initiator and 150 g of $CCl_2FCClF_2$ as a polymerization solvent were added. Then, the interior of the pressure resistant reactor was evacuated, and 22.4 g of tetrafluoro ethylene was added. Then, the mixture was heated to 55° C. to carry out polymerization for 3.5 hours. As a result, 7.9 g of a polymer (hereinafter, referred to as "polymer (A3)") was obtained.

The infrared absorption spectrum of this polymer was measured, and it was confirmed that the absorption attributable to a double bond of a monomer disappeared. The quantitative analysis was carried out by means of $^{19}F$-NMR and $^1H$-NMR, and the composition ratio of dihydrofuran to tetrafluoroethylene was 49:51 (molar ratio).

Preparation Example 4

Into a pressure resistant reactor (internal volume: 200 mL, made of stainless steel), 7.6 g of 2,2-bis(trifluoromethyl)-1,3-dioxol (the above compound (7-1)), 0.2 g of PEROYL IPP (trade name, manufactured by NOF CORPORATION) as a polymerization initiator and 151 g of $CF_2ClCF_2CHFCl$ as a polymerization solvent were added. Then, the interior of the pressure resistant reactor was evacuated, and 10.3 g of tetrafluoro ethylene was added. Then, the mixture was heated to 40° C. to carry out polymerization for 6 hours. As a result, 2.9 g of a polymer (hereinafter, referred to as "polymer (A4)") was obtained.

The infrared absorption spectrum of this polymer was measured, and it was confirmed that the absorption attributable to a double bond of a monomer disappeared. The quantitative analysis was carried out by means of $^{19}F$-NMR and $^1H$-NMR, and the composition ratio of 2,2-bis(trifluoromethyl)-1,3-dioxol to tetrafluoroethylene was 36:64 (molar ratio).

Example 1

0.2 g of a homopolymer of $CF_2=CFOCF_2CF_2CF=CF_2$ (trade name: CYTOP CTL811A, manufactured by Asahi Glass Company, Limited), was press-molded into a transparent film (film thickness: 200 μm) at 230° C. With respect to this film, the refractive indexes (nC, nd, nF, ng), the Abbe number (vd), the relative partial dispersion of a g-F line (θgF) and the deviation from a standard line of the relative partial dispersion of the g-F line (ΔθgF) were measured. The results are shown in Table 1. Further, with respect to a case where optical glass F2 manufactured by SCHOTT AG is employed as high refractive index/high dispersion glass, a value which represents the chromatic aberration amount: (θ1−θ2)/(v1−v2), was calculated, and the result is shown in Table 1. Here, in order to form a standard line, optical glass F2 and optical glass K7 manufactured by SCHOTT AG were used.

It is possible to produce a column product from this polymer by injection molding and produce lenses by cutting the column product and by using a lathe.

Example 2

0.2 g of the polymer (A1) was press-molded into transparent film (film thickness: 200 μm) at 200° C. In the same manner as in Example 1, the physical properties of this polymer were measured. The results are shown in Table 1.

Example 3

0.2 g of the polymer (A2) was press-molded into a transparent film (film thickness: 200 μm) at 200° C. In the same manner as in Example 1, the physical properties of this polymer were measured. The results are shown in Table 1.

Example 4

0.1 g of the polymer (A3) was press-molded into a transparent film (film thickness: 200 μm) at 80° C. In the same manner as in Example 1, the physical properties of this polymer were measured. The results are shown in Table 1.

Example 5

0.1 g of the polymer (A4) was press-molded into a transparent film (film thickness: 200 μm) at 150° C. In the same manner as in Example 1, the physical properties of this polymer were measured. The results are shown in Table 1.

Example 6

0.1 g of a copolymer of perfluorodimethyl dioxol (the above compound (1-1)) and tetrafluoroethylene (trade name: TEFLON AF 1600, manufactured by E.I. du Pont de Nemours & Company (Inc.), Tg=160° C.) was press-molded into a transparent film (film thickness: 200 μm) at 200° C. In the same manner as in Example 1, the physical properties of this polymer were measured. The results are shown in Table 1.

INDUSTRIAL APPLICABILITY

Since the fluoropolymer of the present invention has a high Abbe number, a large relative partial dispersion and a large anomalous dispersion, it is useful for chromatic aberration-free lenses.

The entire disclosure of Japanese Patent Application No. 2006-019072 filed on Jan. 27, 2006, including specification, claims and summary is incorporated herein by reference in its entirety.

What is claimed is:

1. A chromatic aberration-free lens system comprising a combination of (1) a lens wherein nd>1.6, and vd<40, where nd represents a refractive index, and vd represents an Abbe number, and (2) a chromatic aberration-free lens, made of an amorphous fluoropolymer comprising a carbon atom chain as a main chain and comprising a fluorinated atom-bonded carbon atom as a carbon atom of the main chain, wherein vd>75, θgF>0.50, and ΔθgF>0.03, where vd represents an Abbe number, θgF represents a relative partial dispersion of a g-F line, and ΔθgF represents a deviation from a standard line of the relative partial dispersion of the g-F line.

2. The lens system according to claim 1, wherein the fluoropolymer has an aliphatic ring structure in the main chain.

3. The lens system according to claim 2, wherein the fluoropolymer comprises, as a carbon atom of the main chain which constitutes one aliphatic ring, a fluorine atom- or oxygen atom-bonded carbon atom and no hydrogen atom-bonded carbon atom.

4. The lens system according to claim 2, wherein the fluoropolymer comprises, as a carbon atom of the main chain which constitutes one aliphatic ring, a fluorine atom- or oxygen atom-bonded carbon atom and a hydrogen atom-bonded carbon atom.

5. The lens system according to claim 2, wherein the fluoropolymer comprises, as a carbon of the main chain which constitutes one aliphatic ring, a hydrogen atom-bonded carbon atom and no fluorine atom-bonded carbon atom; and contains, as a carbon atom of the main chain which does not constitute the aliphatic ring, a fluorine atom-bonded carbon atom.

6. The lens system according to claim 2, wherein the fluoropolymer is obtained by polymerizing a cyclic monomer comprising, as a carbon atom which constitutes a polymerizable double bond, a fluorine atom-bonded carbon atom and no hydrogen atom-bonded carbon atom or which is obtained by cyclopolymerizing a diene monomer comprising, as a carbon atom which constitutes a polymerizable double bond, a fluorine atom-bonded carbon atom and no hydrogen atom bonded carbon atom.

7. The lens system according to claim 6, wherein the fluoropolymer comprises a monomer unit formed by polymerizing a monomer represented by the following formula (1) or the following formula (2):

TABLE 1

| Ex. | nC | nd | nF | ng | vd | θgF | ΔθgF | (θ1 − θ2)/(v1 − v2) |
|---|---|---|---|---|---|---|---|---|
| 1 | 1.3408 | 1.3419 | 1.3444 | 1.3465 | 95.0 | 0.5833 | 0.1006 | 0.00000910 |
| 2 | 1.3346 | 1.3357 | 1.3380 | 1.3398 | 98.7 | 0.5294 | 0.0531 | −0.00085606 |
| 3 | 1.3561 | 1.3573 | 1.3600 | 1.3622 | 91.6 | 0.5641 | 0.0756 | −0.00033844 |
| 4 | 1.4234 | 1.4251 | 1.4290 | 1.4321 | 75.9 | 0.5536 | 0.0383 | −0.00073920 |
| 5 | 1.3333 | 1.3344 | 1.3369 | 1.3388 | 92.9 | 0.5278 | 0.0415 | −0.00097352 |
| 6 | 1.3061 | 1.3071 | 1.3093 | 1.3110 | 96.0 | 0.5156 | 0.0346 | −0.00112742 |

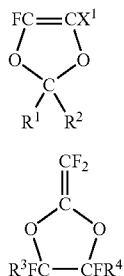

(1)

(2)

where $X^1$ is a fluorine atom, a $C_{1-4}$ perfluoroalkoxyl group or a $C_{1-4}$ perfluoroalkoxyl group, each of $R^1$ and $R^2$ which are independent of each another is a fluorine atom, a $C_{1-4}$ perfluoroalkyl group or a $C_{1-4}$ perfluoroalkoxyl group, and each of $R^3$ and $R^4$ which are independent of each other is a fluorine atom or a trifluoroalkyl group.

8. The lens system according to claim 6, wherein the fluoropolymer comprises a monomer unit formed by cyclopolymerizing a monomer represented by the following formula (3):

$$CF_2=CF-Q^1-CF=CF_2 \qquad (3)$$

where $Q^1$ is a perfluoroalkylene group which may contain an ethereal oxygen atom, wherein the total number of carbon atoms and oxygen atoms excluding a side chain is from 2 to 4.

9. The lens system according to claim 2, wherein the fluoropolymer is obtained by cyclopolymerizing a diene monomer comprising, as a carbon atom which constitutes a polymerizable double bond, a fluorine atom-bonded carbon atom and a hydrogen atom-bonded carbon atom.

10. The lens system according to claim 9, wherein the fluoropolymer comprises a monomer unit formed by cyclopolymerizing a monomer represented by the following formula (4):

$$CFX^2=CX^3-Q^2-CH=CH_2 \qquad (4)$$

where $X^2$ and $X^3$ are fluorine atoms or together form an epoxy oxygen atom or a $C_{2-4}$ perfluoroalkylene group which may contain an ethereal oxygen atom, and $Q^2$ is an alkylene group which may contain an ethereal oxygen atom or a fluorine atom, wherein the total number of carbon atoms and oxygen atoms excluding a side chain is from 2 to 4.

11. The lens system according to claim 2, wherein the fluoropolymer is obtained by polymerizing a fluoroolefin and a cyclic monomer comprising as a carbon atom which constitutes a polymerizable double bond, a hydrogen atom-bonded carbon atom and no fluorine atom-bonded carbon atom.

12. The lens system according to claim 11, wherein the fluoropolymer comprises a monomer unit formed by polymerizing a monomer represented by the following formula (5), the following formula (6) or the following formula (7), and a monomer unit formed by polymerizing a monomer represented by the following formula (8):

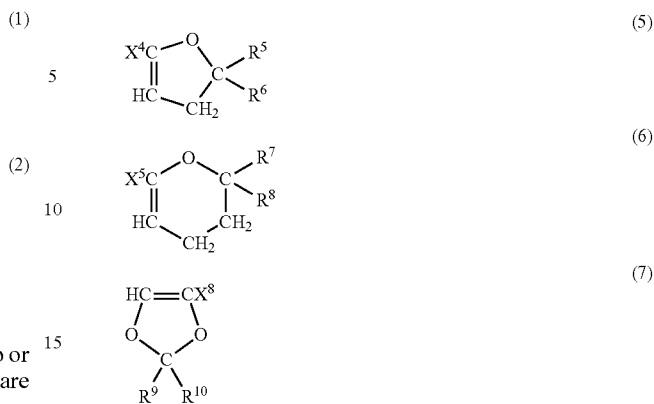

where $X^4$ is a hydrogen atom or a methyl group, each of $R^5$ and $R^6$ which are independent of each other is a hydrogen atom, a fluorine atom or an alkyl group which may contain a fluorine atom, or they together form a $C_{3-5}$ alkylene group which may contain an ethereal oxygen atom or a fluorine atom, $X^5$ is a hydrogen atom or a methyl group, each of $R^7$ and $R^8$ which are independent of each other is a hydrogen atom, a fluorine atom or an alkyl group which may contain a fluorine atom, or they together form a $C_{3-5}$ alkylene group which may contain an ethereal oxygen atom or a fluorine atom, $X^8$ is a hydrogen atom or a methyl group, and each of $R^9$ and $R^{10}$ which are independent of each other is a hydrogen atom, a fluorine atom or an alkyl group which may contain a fluorine atom, or they together form a $C_{3-5}$ alkylene group which may contain an ethereal oxygen atom or a fluorine atom;

$$CF_2=CX^6X^7 \qquad (8)$$

where each of $X^6$ and $X^7$ which are independent of each other is a fluorine atom, a chlorine atom, a hydrogen atom or a trifluoromethyl group.

13. The lens system according to claim 1, wherein the chromatic aberration-free lens (2) has a vd>80, θgF>0.52 and ΔθgF>0.04.

14. The lens system according to claim 1, wherein the chromatic aberration-free lens (2) has a vd>90, θgF>0.55 and ΔθgF>0.05.

15. A method of making a chromatic aberration-free lens system comprising molding an amorphous fluoropolymer containing a carbon atom chain as a main chain and containing a fluorinated atom-bonded carbon atom as a carbon atom of the main chain, into a transparent film, wherein vd>75, θgF>0.50, and ΔθgF>0.03, where vd represents an Abbe number, θgF represents a relative partial dispersion of a g-F line, and ΔθgF represents a deviation from a standard line of the relative partial dispersion of the g-F line, thereby forming a chromatic aberration-free lens, and then combining said chromatic aberration-free lens with a lens wherein nd>1.6 and vd<40, where nd represents a refractive index, thereby forming a chromatic aberration-free lens system.

* * * * *